United States Patent
Zhang et al.

(10) Patent No.: US 10,187,809 B2
(45) Date of Patent: Jan. 22, 2019

(54) SYNCHRONIZATION OF MOVING RELAY NODES AND TERMINALS IN CELLULAR NETWORKS

(75) Inventors: Shun Liang Zhang, Beijing (CN); Simone Redana, Munich (DE); Bernhard Raaf, Neuried (DE); Lei Du, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 1037 days.

(21) Appl. No.: 14/008,635

(22) PCT Filed: Mar. 31, 2011

(86) PCT No.: PCT/EP2011/054993
§ 371 (c)(1),
(2), (4) Date: Nov. 21, 2013

(87) PCT Pub. No.: WO2012/130309
PCT Pub. Date: Oct. 4, 2012

(65) Prior Publication Data
US 2014/0080468 A1    Mar. 20, 2014

(51) Int. Cl.
*H04W 24/02* (2009.01)
*H04W 48/08* (2009.01)
*H04W 84/00* (2009.01)
*H04W 84/04* (2009.01)

(52) U.S. Cl.
CPC ............ *H04W 24/02* (2013.01); *H04W 48/08* (2013.01); *H04W 84/005* (2013.01); *H04W 84/047* (2013.01)

(58) Field of Classification Search
CPC .................................................. H04W 24/02
See application file for complete search history.

(56) References Cited

U.S. PATENT DOCUMENTS

| | | | |
|---|---|---|---|
| 2009/0047955 A1* | 2/2009 | Frenger | H04J 11/0093 455/436 |
| 2011/0194407 A1* | 8/2011 | Ji | H04B 7/2606 370/226 |
| 2012/0207040 A1* | 8/2012 | Comsa | H04W 72/1215 370/252 |

FOREIGN PATENT DOCUMENTS

| | | |
|---|---|---|
| CN | 101836476 A | 9/2010 |
| WO | WO 2010/095727 A1 | 8/2010 |

OTHER PUBLICATIONS

3GPP TSG-RAN WG3 #62, Nov. 10-14, 2008, Prague, Czech Republic, R3-083000, "PCI Reselection and Use of Temporary PCIs", Qualcomm Europe, 3 pgs.

* cited by examiner

*Primary Examiner* — David Orange
(74) *Attorney, Agent, or Firm* — Harrington & Smith

(57) ABSTRACT

There are provided measures for a cell reconfiguration, more specifically a cell reconfiguration in a relay-enhanced network environment. Such measures exemplarily include recognizing a decision on a change of a configuration of a base station, informing a user equipment served by the base station due to a forthcoming change of at least one of a manipulated synchronization failure value or a manipulated radio link failure value before the configuration of the base station is changed, and providing the user equipment being served by the base station with a synchronization signal indicating a new configuration after the configuration of the base station is changed from an old configuration to the new configuration.

22 Claims, 11 Drawing Sheets

SYNCHRONIZATION OF MOVING RELAY NODES AND TERMINALS IN CELLULAR NETWORKS

FIELD OF THE INVENTION

The present invention relates to a cell reconfiguration. More specifically, the present invention may relate to a cell reconfiguration in a relay-enhanced network environment, namely a relay cell reconfiguration.

BACKGROUND OF THE INVENTION

In the development of radio communication systems, such as mobile communication systems, efforts are made for an evolution of the radio access part thereof. In this regard, the evolution of radio access networks (like for example the GSM EDGE radio access network (GERAN) and the Universal Terrestrial Radio Access Network (UTRAN) or the like) is currently addressed. Such improved radio access networks are sometimes denoted as evolved radio access networks (like for example the Evolved Universal Terrestrial Radio Access Network (E-UTRAN)) or as being part of a long-term evolution (LTE) or LTE-Advanced. Although such denominations primarily stem from 3GPP (Third Generation Partnership Project) terminology, the usage thereof hereinafter does not limit the respective description to 3GPP technology, but generally refers to any kind of radio access evolution irrespective of the underlying system architecture. Another example for an applicable broadband access system may for example be IEEE 802.16 also known as WiMAX (Worldwide Interoperability for Microwave Access).

In the following, for the sake of intelligibility, LTE (Long-Term Evolution according to 3GPP terminology) or LTE-Advanced is taken as a non-limiting example for a broadband radio access network being applicable in the context of the present invention and its embodiments. However, it is to be noted that any kind of radio access network may likewise be applicable, as long as it exhibits comparable features and characteristics as described hereinafter.

In the development of cellular systems in general, and access networks in particular, relaying has been proposed as one concept. In relaying, a terminal or user equipment (UE) is not directly connected with an access node such as a radio base station (e.g. denoted as eNodeB or eNB) of a radio access network (RAN), but via a relay node (RN) which is connected to the access node. Relaying by way of relay nodes has been proposed as a concept for coverage extension in cellular systems. Apart from this main goal of coverage extension, introducing relay concepts can also help in providing high-bit-rate coverage in high shadowing environments, reducing the average radio-transmission power at the a user equipment (thereby leading to long battery life), enhancing cell capacity and effective throughput, (e.g. increasing cell-edge capacity and balancing cell load), and enhancing overall performance and deployment cost of radio access networks.

FIG. 1 shows a schematic diagram of a typical deployment scenario of a relay-enhanced cellular system, such as e.g. a LTE or LTE-Advanced RAN with radio-relayed extensions, for which exemplary embodiments of the present invention are applicable. As shown in FIG. 1, UEs, e.g. those located at disadvantaged positions such as a cell edge and/or high shadowing areas, are connected to a so-called donor base station (DeNB) via a respective relay node RN. Generally, any one of the relay nodes may be stationary/fixed or mobile.

The coverage or service area of a relay node may be referred to as relay cell, and the coverage or service area of a donor base station may be referred to as donor cell. Accordingly, both the DeNB as well as the RNs may be regarded as access nodes or base stations of an access network, possibly as access nodes or base stations of different hierarchical levels in terms of logical and/or structural network deployment.

In a relay-enhanced cellular system, a relay node acts as a user equipment (UE) from the point of view of its serving donor base station (DeNB) and as a base station (eNB) from the point of view of its served user equipment or terminal (UE) of an actual user. Accordingly, a relay node, also referred to as relay base station or relay cell hereinafter, supports both UE and eNB functionality and, thus, incorporates both UE and eNB functions.

FIG. 2 shows a schematic diagram of a system architecture of a relay-enhanced cellular system, such as e.g. a LTE or LTE-Advanced RAN with radio-relayed extensions, for which exemplary embodiments of the present invention are applicable. As shown in FIG. 2, further network entities and/or functions are involved, such as a mobility management entity/function (MME) for the RN-UE function and the user terminal, a serving gateway (SGW) and a packet data network gateway (PGW) entity/function for the RN-UE function and the user terminal, as well as an optional relay gateway (GW) entity/function. While various alternative implementations are conceived (being indicated the blocks denoted as Alt. 1, Alt. 2 and Alt. 3), the implementation according to Alt. 2 is currently specified as standard.

The individual entities/functions are linked by specified interfaces indicated between respective blocks in FIG. 2. In particular, the (wireless) link between donor base station (DeNB) and relay node (RN) is referred to as Un link or relay link, and the (wireless) link between the relay node (RN) and the terminal or user equipment (UE) is referred to as Uu link or access link.

The following specification particularly relates to the case of mobile relay nodes as well as specific issues and problems thereof in comparison with stationary/fixed relay nodes.

An important use case in relaying is group mobility, where the relay node is moved when serving its UE or UEs. For example, such mobile relay cell scenario applies when the relay node is installed in a moving entity, such as a (high speed) train, and serves the UEs of the people traveling e.g. in the (high speed) train. In such mobile relay cell scenario, the relay node will have to connect to various donor base stations during the traveling e.g. of the (high speed) train, which are installed along the rails. Such mobile relay cell scenario is exemplarily illustrated in FIG. 3.

According to the current specifications, a relay node appears to its UE or UEs as a distinct cell with respect to its donor cell. Therefore, each relay node cell should be configured with a different physical cell identifier (PCI). To avoid confusion and/or collision at the UE side, it is required that each cell (including each relay node cell) is configured with a different PCI among its surrounding neighboring cells. To solve the PCI confusion and/or collision issue, a PCI selection framework is currently specified, wherein one or more PCIs are selected for each D/eNB by a centralized or distributed algorithm before operating. Thereby, the PCI confusion and/or collision regarding the D/eNB could usually be avoided, since the D/eNB maintains its PCI during operation. That is to say, as the D/eNB does usually not move, it is not necessary to change its PCI during operation, since no the PCI confusion and/or collision could arise e.g. due to a changing network environment.

However, for mobile (moving) relay nodes, the situation is substantially different.

The selected PCI for the relay node cell is uniquely defined by the algorithm when operating at one place. While, during the period of moving, some new neighbors may appear, the previously selected PCI of a mobile (moving) relay node cell may not be unique anymore at the new place. To avoid the PCI confusion and/or collision, it is thus required to change the old PCI to a new PCI which is unique at the new place. Given that many UEs could be served by the relay node cell during the moving period, the change of the PCI on the fly raises a new issue for mobile (moving) relay nodes. Namely, the change of the PCI would typically interrupt the service continuation of UE/UEs currently served by the relay node due to a radio link failure (RLF) detected by the UE/UEs.

Accordingly, when the on-the-fly PCI change at the relay node is required, the negative impact to UE/UEs currently served by the relay node is to be avoided or at least reduced.

FIG. 4 shows a time chart illustrating an exemplary RLF detection and RRC connection re-establishment process.

As illustrated in FIG. 4, in case the PCI is changed (thus terminating the preceding normal operation), the served UE/UEs will no longer detect the synchronization signal indicated by the old PCI of the serving cell and enter a RLF recovery and RRC connection re-establishment process.

Namely, when the value of a maximum number of out-of-sync indications (N310) is exceeded, a RLF timer (T310) is started so as to start a RLF discovery (sync recovery) process. When the sync recovery fails until lapse of the RFL timer (T310), a RLF is detected, and a RRC connection re-establishment process is initiated.

According to current specifications, the radio link quality estimation period for out-of-sync indications could be set to 200 ms. Usually, the default values for N310 and T310 are N310=1 and T310=1000 ms, respectively. Thus, the typical time from PCI change (i.e. from the time when a UE can not receive the cell-specific reference signal) to RLF detection (i.e. the time when UE detects RLF) is about 1200 ms. This long interruption time (delay) would seriously impact the experience of users. Therefore, mechanisms to improve user experience during an on-the-fly PCI change at a base station or cell, such as for example a mobile (moving) relay node or relay node cell, are desirable.

As stated above, the change of PCI on the fly is not required for D/eNBs or fixed relay nodes, since the existing PCI selection approach is effective for such base stations. Accordingly, there is currently not specified any solution to the above-outlined issues and problems of mobile (moving) relay nodes.

According to certain considerations in this regard, it could be conceivable to avoid or resolve PCI confusion/collision in case of mobile (moving) relay nodes. For example, if collision avoidance fails and, during collision resolution, the moving relay node is selected to change the PCI, it could be conceivable that the UEs served by the moving relay node are handed over to the DeNB or to other nodes (base stations). However, this is not always possible, e.g. in case the neighboring cells are overloaded, and the UEs connected to the RN would thus experience a radio link failure and service interruption. The UEs served by the relay node could typically be moving with the moving relay node, and the signal from neighboring nodes might be strongly attenuated by the vehicle upon which the relay node is installed, which is why handing over these UEs to the DeNB or other nodes might spoil the performance in the neighboring cells. Otherwise, it could also be conceivable to reserve a part of available PCIs for mobile relay nodes, and to keep the PCI of moving relay nodes unchanged. Thereby, PCI confusion and collision between relay nodes and other neighboring cells could be avoided, but there would still exist a problem of a potential PCI confusion and/or collision between different relay nodes.

In view thereof, there do not exist any mechanisms for enabling cell reconfiguration (for example, in a relay-enhanced network environment) in a proper an efficient manner. Accordingly, such mechanisms are needed.

SUMMARY OF EMBODIMENTS OF THE INVENTION

Embodiments of the present invention aim at addressing at least part of the above issues and/or problems and drawbacks.

Embodiments of the present invention are made to provide mechanisms for enabling cell reconfiguration (for example, in a relay-enhanced network environment) in a proper an efficient manner.

This may for example be achieved by the subject-matter defined in the attached claims.

According to an exemplary first aspect of the present invention, there is provided a method comprising recognizing a decision on a change of a configuration of a base station, informing a user equipment served by the base station in view of a forthcoming change of the configuration before the configuration of the base station is changed, and providing the user equipment being served by the base station with a synchronization signal indicating a new configuration after the configuration of the base station is changed from an old configuration to the new configuration.

According to further developments or modifications thereof, one or more of the following applies:
- the informing includes the new configuration or the new and old configurations,
- if the informing includes the new configuration or the new and old configurations,
  - the method further comprises increasing a synchronization failure value for detecting a synchronization failure at the user equipment before the configuration of the base station is changed, informing the increased synchronization failure value, and recovering the synchronization failure value and informing the recovered synchronization failure value after the configuration of the base station is changed,
- the informing includes a radio link failure timer for detecting a radio link failure at the user equipment,
- if the informing includes a radio link failure timer for detecting a radio link failure at the user equipment,
  - the method further comprises decreasing the radio link failure timer before the configuration of the base station is changed, informing the decreased radio link failure timer, and recovering the radio link failure timer and informing the recovered radio link failure timer after the configuration of the base station is changed,
- the method further comprises evaluating a type and/or capability of the user equipment or multiple user equipments served by the base station, and selecting a way of informing the user equipment based on the evaluated type and/or capability of the user equipment or multiple user equipments,
- the method further comprises detecting a collision between the configuration of the base station and at least one other base station, or receiving, from a user equipment served by the base station, a report on a collision between the configuration of the base station and at least one other base station, said report including evolved cell configurations of the base station and the other base station, initiating making a decision on a change of the configuration of the base station or the other base station, and performing the informing and the providing when recognizing the decision on the change of the configuration of the base station, the method is operable at and/or by the base station, and/or the informing includes sending a system information update.

According to an exemplary second aspect of the present invention, there is provided a method comprising receiving an information in view of a forthcoming change of a configuration of a base station, and receiving a provision of a synchronization signal indicating a valid configuration of the base station.

According to further developments or modifications thereof, one or more of the following applies:

the information includes a new configuration or new and old configurations, between which the configuration of the base station is decided to be changed, if the information includes a new configuration or new and old configurations, the method further comprises storing, upon receipt of the information, a mapping between the old configuration and the new configuration of the base station, checking, upon receipt of the synchronization signal, whether a mapping between the old configuration and the valid configuration indicated in the synchronization signal is stored, and updating, if a mapping between the old configuration and the valid configuration indicated in the synchronization signal is stored, the old configuration with the new configuration based on the stored mapping, or initiating, if a mapping between the old configuration and the valid configuration indicated in the synchronization signal is not stored, a cell measurement and reselection process using the valid configuration indicated in the synchronization signal, the method further comprises receiving, in the information, a synchronization failure value for detecting a synchronization failure, and applying the received synchronization failure value for synchronization failure detection before receiving a different synchronization failure value from the base station, the information includes a radio link failure timer for detecting a radio link failure at the user equipment, if the information includes a radio link failure timer for detecting a radio link failure at the user equipment, the method further comprises applying the received radio link failure timer for radio link failure detection before receiving a different radio link failure timer from the base station, and performing a connection re-establishment process after radio link failure detection using the received radio link failure timer, the method further comprises ignoring the received radio link failure timer depending on a type and/or capability of user equipment being served by the base station, the method further comprises detecting a collision between the configuration of the base station and at least one other base station, and sending a report on the detected collision to the base station, said report including evolved cell configurations of the base station and the other base station, the method is operable at and/or by a user equipment served by the base station, and/or the receiving includes receiving a system information update.

According to an exemplary third aspect of the present invention, there is provided an apparatus comprising an interface configured to communicate with another apparatus, and a processor configured to recognize a decision on a change of a configuration of a base station, inform, via the interface, a user equipment served by the base station in view of a forthcoming change of the configuration before the configuration of the base station is changed, and provide, via the interface, the user equipment being served by the base station with a synchronization signal indicating a new configuration after the configuration of the base station is changed from an old configuration to the new configuration.

According to further developments or modifications thereof, one or more of the following applies: . . .

the processor, for informing, is configured to include the new configuration or the new and old configurations, if the processor is configured to include the new configuration or the new and old configurations, the processor is further configured to increase a synchronization failure value for detecting a synchronization failure at the user equipment before the configuration of the base station is changed, inform, via the interface, the increased synchronization failure value, and recover the synchronization failure value and inform, via the interface, the recovered synchronization failure value after the configuration of the base station is changed, the processor, for informing, is configured to include a radio link failure timer for detecting a radio link failure at the user equipment, if the processor is configured to include a radio link failure timer for detecting a radio link failure at the user equipment, the processor is further configured to decrease the radio link failure timer before the configuration of the base station is changed, inform, via the interface, the decreased radio link failure timer, and recover the radio link failure timer and inform, via the interface, the recovered radio link failure timer after the configuration of the base station is changed, the processor is further configured to evaluate a type and/or capability of the user equipment or multiple user equipments served by the base station, and select a way of informing the user equipment based on the evaluated type and/or capability of the user equipment or multiple user equipments, the processor is further configured to detect a collision between the configuration of the base station and at least one other base station, or receive, via the interface, from a user equipment served by the base station, a report on a collision between the configuration of the base station and at least one other base station, said report including evolved cell configurations of the base station and the other base station, initiate making a decision on a change of the configuration of the base station or the other base station, and perform the informing and the providing when recognizing the decision on the change of the configuration of the base station.

the apparatus is operable as and/or at the base station, and/or the processor, for informing, is configured to send, via the interface, a system information update.

According to an exemplary fourth aspect of the present invention, there is provided an apparatus comprising an interface configured to communicate with another apparatus, and a processor configured to receive, via the interface, an information in view of a forthcoming change of a configuration of a base station, and receive, via the interface, a provision of a synchronization signal indicating a valid configuration of the base station.

According to further developments or modifications thereof, one or more of the following applies:

the information includes a new configuration or new and old configurations, between which the configuration of the base station is decided to be changed, if the information includes a new configuration or new and old configurations, the processor is further configured to store, in a storage, upon receipt of the information, a mapping between the old configuration and the new configuration of the base station, check, upon receipt of the synchronization signal, whether a mapping between the old configuration and the valid configuration indicated in the synchronization signal is stored, and update, if a mapping between the old configuration and the valid configuration indicated in the synchronization signal is stored, the old configuration with the new configuration based on the stored mapping, or initiate, if a mapping between the old configuration and the valid configuration indicated in the synchronization signal is not stored, a cell measurement and reselection process using the valid configuration indicated in the synchronization signal, the processor is further configured to receive, via the interface, in the information, a synchronization failure value for detecting a synchronization failure, and apply the received synchronization failure value for synchronization failure detection before receiving a different synchronization failure value from the base station, the information includes a radio link failure timer for detecting a radio link failure at the user equipment, if the information includes a radio link failure timer for detecting a radio link failure at the user equipment, the processor is further configured to apply the received radio link failure timer for radio link failure detection before receiving a different radio link failure timer from the base station, and perform a connection re-establishment process after radio link failure detection using the received radio link failure timer, the processor is further configured to ignore the received radio link failure timer depending on a type and/or capability of user equipment being served by the base station, the processor is further configured to detect a collision between the configuration of the base station and at least one other base station, and send, via the interface, a report on the detected collision to the base station, said report including evolved cell configurations of the base station and the other base station, the apparatus is operable as and/or at a user equipment served by the base station, and/or the processor, for receiving, is configured to receive, via the interface, a system information update.

According to an exemplary fifth aspect of the present invention, there is provided a computer program product including a program comprising software code portions being arranged, when run on a processor of an apparatus (such as e.g. according to the above third aspect and/or developments or modifications thereof), to perform the method according to the above first aspect and/or developments or modifications thereof.

According to an exemplary sixth aspect of the present invention, there is provided a computer program product including a program comprising software code portions being arranged, when run on a processor of an apparatus (such as e.g. according to the above fourth aspect and/or developments or modifications thereof), to perform the method according to the above second aspect and/or developments or modifications thereof.

According to further developments or modifications thereof, the computer program product according to the fifth or sixth aspect comprises a computer-readable medium on which the software code portions are stored, and/or the program is directly loadable into a memory of the processor.

According to any one of the above aspects and/or developments or modifications thereof, the configuration of the base station may include at least one of an identifier of the base station, a used bandwidth of the base station, an antenna configuration of the base station, a codec assignment of the base station, a timing setting of the base station, a frequency and/or channel setting of the base station, and any other cell-related setting of the base station.

According to any one of the above aspects and/or developments or modifications thereof, the base station may comprise an access node or base station in a relay-enhanced network environment, and/or the base station may comprise a mobile access node or base station, and/or the base station may comprise an access node or base station in accordance with an LTE or LTE-Advanced radio access system.

By way of exemplary embodiments of the present invention, there are provided mechanisms for enabling node/cell reconfiguration (for example, in a relay-enhanced network environment) in a proper an efficient manner.

By way of exemplary embodiments of the present invention, there are provided mechanisms for reconfiguring a base station or cell, such as for example a mobile relay node/cell, while avoiding or at least reducing the negative impact to user equipment currently served by the (e.g. relay) node or cell. Such (e.g. mobile relay) node/cell reconfiguration could comprise changing a configuration (such as an identifier, e.g. PCI, or any other cell-related parameter setting) at the (e.g. mobile relay) node/cell so as to handle a potential confusion and/or collision in this regard.

BRIEF DESCRIPTION OF THE DRAWINGS

In the following, the present invention will be described in greater detail by way of non-limiting examples with reference to the accompanying drawings, in which.

DETAILED DESCRIPTION OF EMBODIMENTS OF THE PRESENT INVENTION

Figure 1:
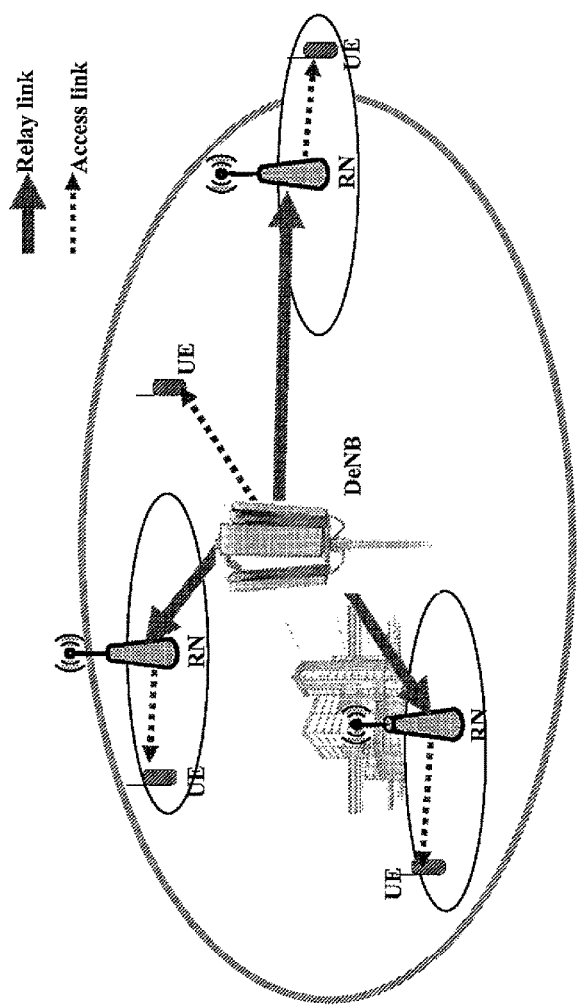
FIG. 1 shows a schematic diagram of a typical deployment scenario of a relay-enhanced cellular system for which exemplary embodiments of the present invention are applicable.
Figure 2:
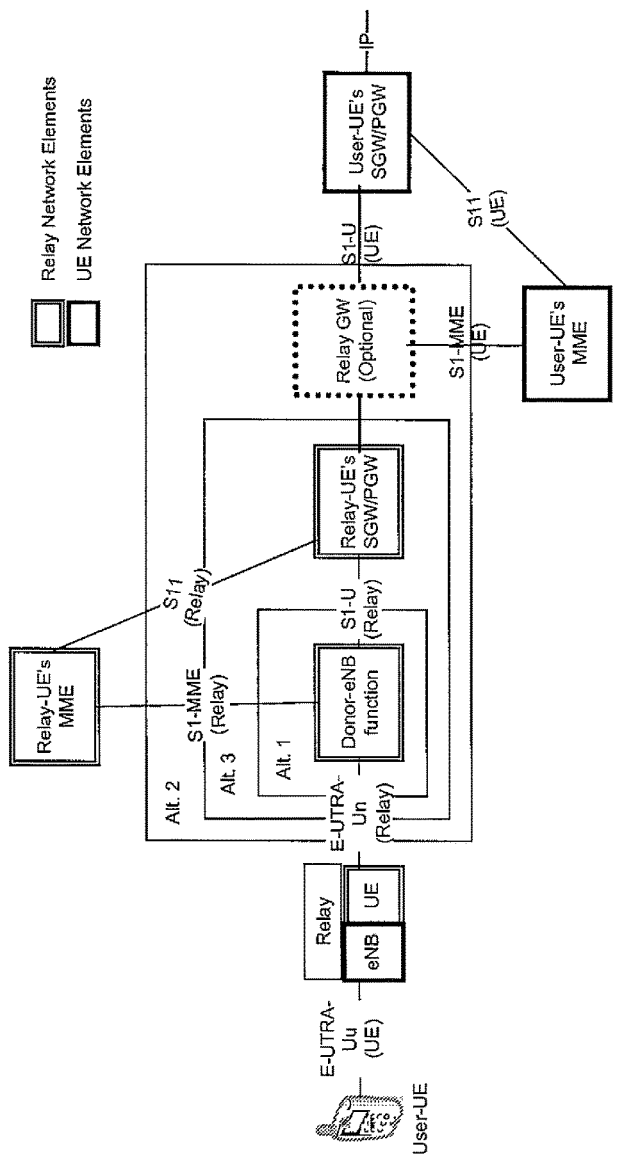
FIG. 2 shows a schematic diagram of a system architecture of a relay-enhanced cellular system for which exemplary embodiments of the present invention are applicable.
Figure 3:
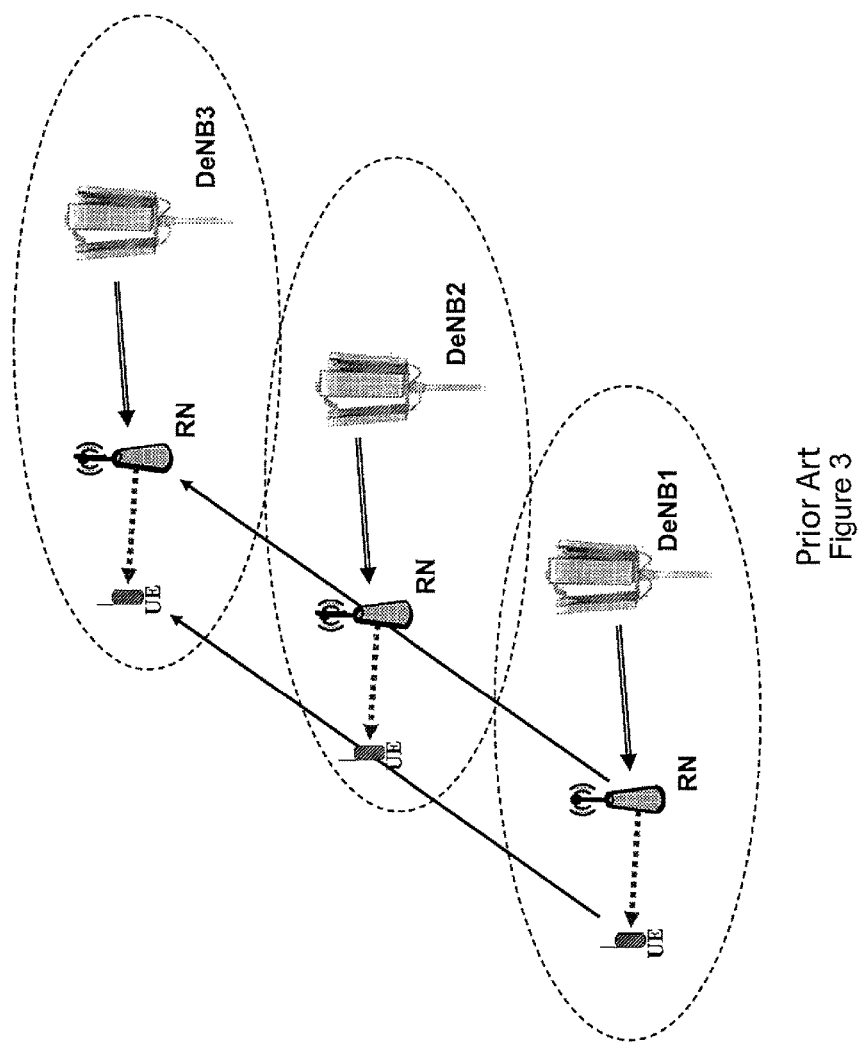
FIG. 3 shows a schematic diagram of a mobile relay cell scenario for which exemplary embodiments of the present invention are applicable.
Figure 4:
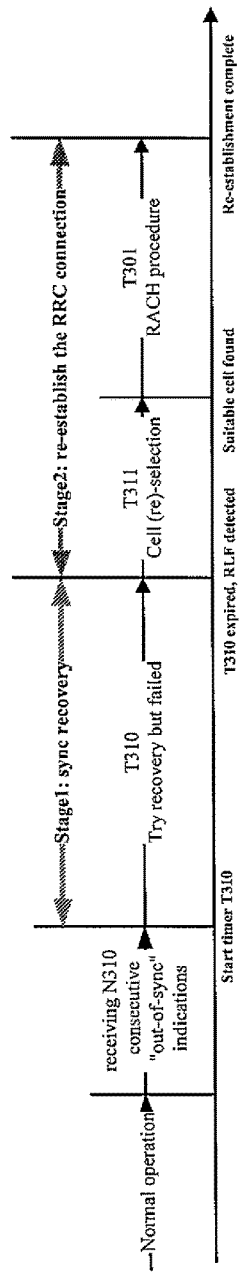
FIG. 4 shows a time chart illustrating an exemplary RLF detection and RRC connection re-establishment process.

The present invention is described herein with reference to particular non-limiting examples and to what are presently considered to be conceivable embodiments of the present invention. A person skilled in the art will appreciate that the invention is by no means limited to these examples, and may be more broadly applied.

The present invention and its embodiments are mainly described in relation to 3GPP specifications being used as non-limiting examples for certain exemplary network configurations and deployments. In particular, an LTE (E-UTRAN) radio access network and corresponding standards (LTE releases 8, 9 and LTE-Advanced release 10 and beyond) are used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other network configuration or system deployment, etc. may also be utilized as long as compliant with the features described herein.

Generally, embodiments of the present invention may be applicable for/in any kind of modern and future communication network including any conceivable mobile/wireless communication networks according to 3GPP (Third Generation Partnership Project) or IETF (Internet Engineering Task Force) specifications.

In particular, embodiments of the present invention may be applicable in any relay-enhanced cellular system such as for example in any relay-enhanced (cellular) access system, specifically in case of one or more mobile relay nodes/cells existing therein.

While the subsequent specification particularly refers to mobile relay nodes (base stations) and cells, this is to be understood as a non-limiting exemplary use case only.

Generally, embodiments of the present invention are applicable to/for any cell reconfiguration, i.e. in all scenarios in which the configuration of a base station changes for some reason. The change of a configuration of a mobile relay node due to movement to another place, as referred to hereinafter, is only one exemplary scenario in this regard, which is conceivable for a skilled person, and the present invention and/or its embodiments are thus not restricted thereto. Another exemplary scenario in this regard resides in the change of a configuration of a fixed base station or relay node e.g. due to movement of another mobile node into its vicinity. For example, it might be preferred to modify the configuration of the fixed base station (or relay node), for example to avoid collisions in future when the same mobile base station (or relay node) again crosses the coverage area of the fixed base station (or relay node).

Namely, in the case of a collision (e.g. a PCI collision) between a fixed base station or relay node and a mobile base station or relay node, it is equally conceivable that the identifier (as an exemplary configuration setting) of the fixed base station or relay node, the identifier (as an exemplary configuration setting) of the mobile base station or relay node, or both are modified.

Accordingly, in view of the above-outlined scenarios, any subsequent reference to a base station, an access node, a relay node/cell or the like may equally apply to a fixed base station or relay node, a mobile base station or relay node, or both.

While the subsequent specification particularly refers to an identifier (especially the PCI) of a base station as an exemplary configuration setting, this is to be understood as a non-limiting exemplary use case only.

Generally, embodiments of the present invention are applicable to/for any cell reconfiguration, i.e. in all scenarios in which the configuration of a base station changes for some reason. The change of a configuration of a base station may include the change of any parameter or setting which is designed (suitable) to be changed easily. This could for example include the change of one or more of an identifier, such as a physical cell identifier, of the base station, a used bandwidth of the base station, an antenna configuration of the base station, an codec assignment of the base station, a timing setting of the base station, a frequency and/or channel setting of the base station, and any other cell-related setting of the base station.

Accordingly, in view of the above-outlined examples, any subsequent reference to a configuration of a base station may equally apply to one of the aforementioned examples of conceivable configuration settings. As mentioned above, an identifier, especially the PCI, is subsequently used as a non-limiting example for the sake of clarity and simplicity of description only.

Hereinafter, various embodiments and implementations of the present invention and its aspects or embodiments are described using several alternatives. It is generally noted that, according to certain needs and constraints, all of the described alternatives may be provided alone or in any conceivable combination (also including combinations of individual features of the various alternatives).

According to exemplary embodiments of the present invention, in general terms, there are provided mechanisms, measures and means for enabling node/cell reconfiguration (for example, in a relay-enhanced network environment) in a proper an efficient manner.

According to exemplary embodiments of the present invention, node/cell reconfiguration may be achieved by way of an UE-assisted approach, a network-based approach, and/or a combination thereof.

In the following description, the PCI (Physical cell identifier) is used as a non-limiting example for any conceivable identifier of a relay node/cell, and the ECGI (evolved cell global identifier) is used as a non-limiting example for any conceivable cell identifier of a relay node/cell. It is to be understood that these specific non-limiting examples do not limit the exemplary embodiments of the present invention thereto.

Figure 5:
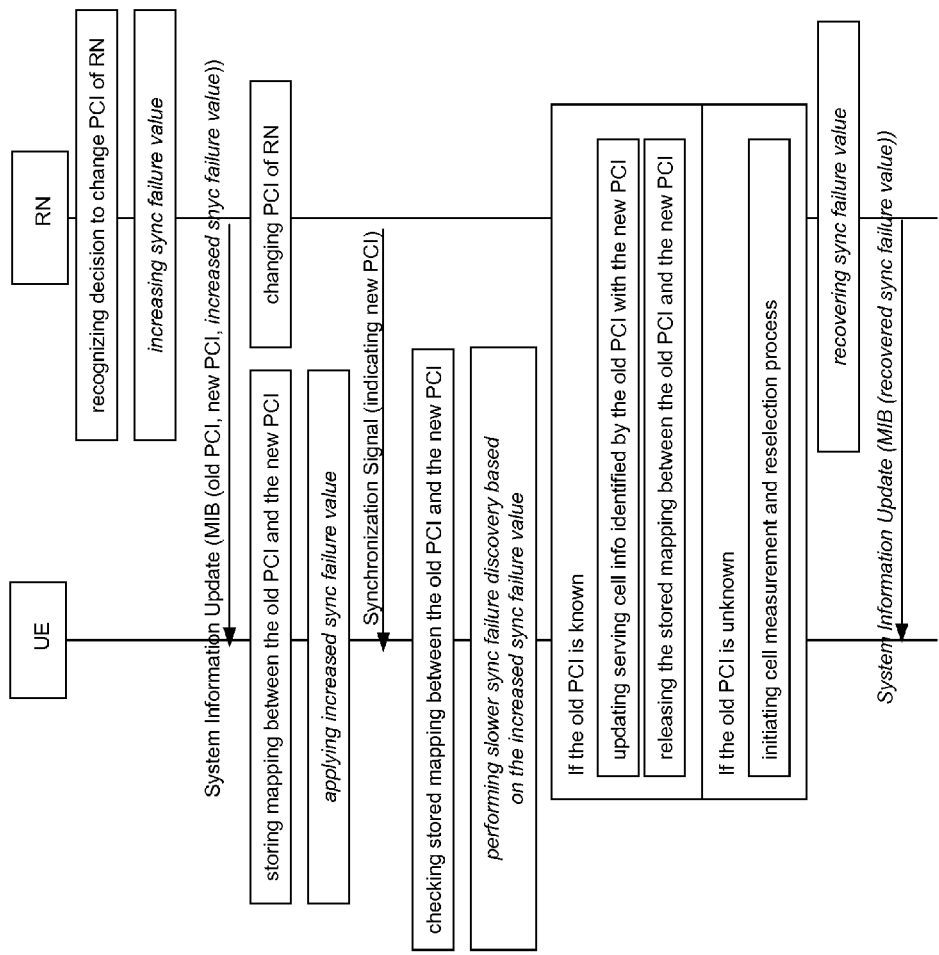
FIG. 5 shows a signaling diagram illustrating an exemplary UE-assisted procedure according to exemplary embodiments of the present invention.

FIG. 5 shows a signaling diagram illustrating an exemplary UE-assisted procedure, i.e. a UE-assisted approach, according to exemplary embodiments of the present invention.

In the procedure according to FIG. 5, the (e.g. mobile) relay node or base station (hereinafter simply referred to as RN) representing the (e.g. mobile) relay cell recognizes that a decision to change its PCI (wherein the PCI is used hereinafter as a non-limiting example for any conceivable relay node/cell identifier which is a non-limiting example for any conceivable relay node/cell configuration) is made. This decision may be made locally or remotely, and it may be the outcome of any conceivable PCI collision detection procedure, such as for example any one of those described in connection with FIGS. 9 and 10 below. Upon recognition of the PCI change decision, the RN informs its served UE (wherein herein only a single UE is exemplarily depicted, while more than one UE may be applicable in this regard) in view of a forthcoming PCI change still before the PCI is changed. After the PCI is changed, the RN provides its served UE with a synchronization signal indicating the new PCI.

As depicted in FIG. 5, in view of the forthcoming configuration change, before changing the PCI on the fly, the RN informs the forthcoming change of the PCI (i.e. the fact that the PCI will be changed soon) to the UE in advance by way of a system information update. In particular, according to exemplary embodiments of the present invention, the new PCI which is decided to be used in the future, is informed to the UE, and alternatively also the hitherto used PCI is informed to the UE. Such information of the new PCI and optionally the old PCI may be accomplished by way of a dedicated information element (IE) in the system information update, specifically in the master information block or system information block. Upon receiving the system information update from its serving RN, the UE knows, based on the new information element carrying the relevant PCI or PCIs, know that the old PCI of the relay cell will be replaced by a new PCI, and hence stores the association relation between the old PCI and the new PCI in a corresponding mapping.

After the system information update is provided to the UE, the RN replaces the old PCI by the new selected PCI, i.e. performs the PCI change, and changes the synchronization signal accordingly. Upon the change of PCI, the RN informs its served UE/UEs (and, potentially, it neighbor(s), i.e. neighboring RNs, BSs, DeNBs, and the like) about the new PCI applied on its cell. That is, the RN sends a synchronization signal indicating the new and currently valid PCI to the UE. When detecting the new synchronization signal information indicating the new PCI, the UE checks if it has an association (mapping) between the old PCI and the new PCI. In case the old PCI is found in such stored mapping, the UE does not consider the relay cell being identified by the new PCI as a newly detected cell but knows that this relay cell is equal to the previously serving relay cell, and updates the relay cell, i.e. the serving cell information, identified by the old PCI with the new PCI by using the corresponding stored mapping. Thereupon, the corresponding stored mapping may be released, i.e. deleted. In case the old PCI is not found in such stored mapping, the UE considers the relay cell being identified by the new PCI as a newly detected cell, and initiates a cell measurement and reselection process.

As depicted in FIG. 5, the above-outlined basic procedure may be enhanced by manipulating a synchronization failure value, such as N310 according to current specifications. Such enhancement is depicted by way of operations printed in italics in FIG. 5.

That is, considering the potential delay on the UE side and the RN side upon the PCI change, the RN may configure the N310 value in the relay cell with a bigger value than during the normal operation, i.e. increase the same, to avoid that the UE starting the synchronization failure discovery/recovery before detecting the above-described synchronization signal indicating the new PCI. Then, after being informed accordingly, the UE may apply the increased N310 value for slowing down the synchronization failure discovery/recovery. For example, changing the N310 from 1 to 2 or 3 allows the UE to stay longer in the N310 state (i.e. the time period between loss of synchronization and start of RLF discovery/recovery) and have the PCI change before the UE enter in the RLF recovery process. To avoid the potential negative impact of the increased N310 value in comparison to the normal RLF case, the RN afterwards recovers the N310 value to its normal setting, and informs the UE of the normal setting by another system information update.

By virtue of the procedure according to FIG. 5, the service interruption time (delay) according to a conventional technique may be avoided or at least reduced. This is because, when the synchronization with the serving relay cell is lost due to the PCI change thereof, the UE does not (need to) initiate a RLF discovery/recovery process at all. Rather, the UE may check its local storage for stored mappings and thus easily and quickly acquire the association between relevant PCIs so as to update the required information accordingly, or initiate a corresponding cell measurement and reselection process. While this effect may well be achieved by way of the basic procedure, it may be ensured (i.e. achieved with an even higher possibility) by way of the enhanced procedure. That is, the enhanced procedure further increases the reliability of such procedure.

Considering the overhead to system information due to indicating new and/or old PCI according to exemplary embodiments of the present invention, another viable way of a UE-assisted approach according to exemplary embodiments of the present invention is to have the RN, in view of the forthcoming configuration change, only informing the forthcoming configuration change as such. For example, the RN may inform the UE of the forthcoming change of the PCI via a 1-bit indication. With such indication (and, optionally, ECGI of the of the RN cell) in mind, when the new PCI takes effect in the RN cell (i.e. the configuration is changed at the network side), the UE could take the newly detected PCI from a synchronization channel as the new PCI of the RN.

In the above-mentioned way, the incorporation of the ECGI of the RN cell is effective for avoiding potential erroneous judgments at the UE. Namely, the old EGCI of the RN could be used to differentiate the RN-changed PCI and another possible new ECGI. Accordingly, in case the ECGI is known and with the additional 1-bit signaling, a UE could derive that the RN changed its PCI with even higher possibility than without the ECGI indication (at least, unless ECGI and PCI are changed simultaneously).

The basic and/or enhanced UE-assisted approach according to exemplary embodiments of the present invention is particularly applicable for UEs having the corresponding functionality. That is, this approach has a backward compatibility issue, i.e. is not applicable for legacy UEs lacking the corresponding functionality on the UE side. This is essentially because legacy UEs are not able to understand the new dedicated information element (IE) in the system information update that contains the new PCI and, optionally, the old PCI.

Figure 6:
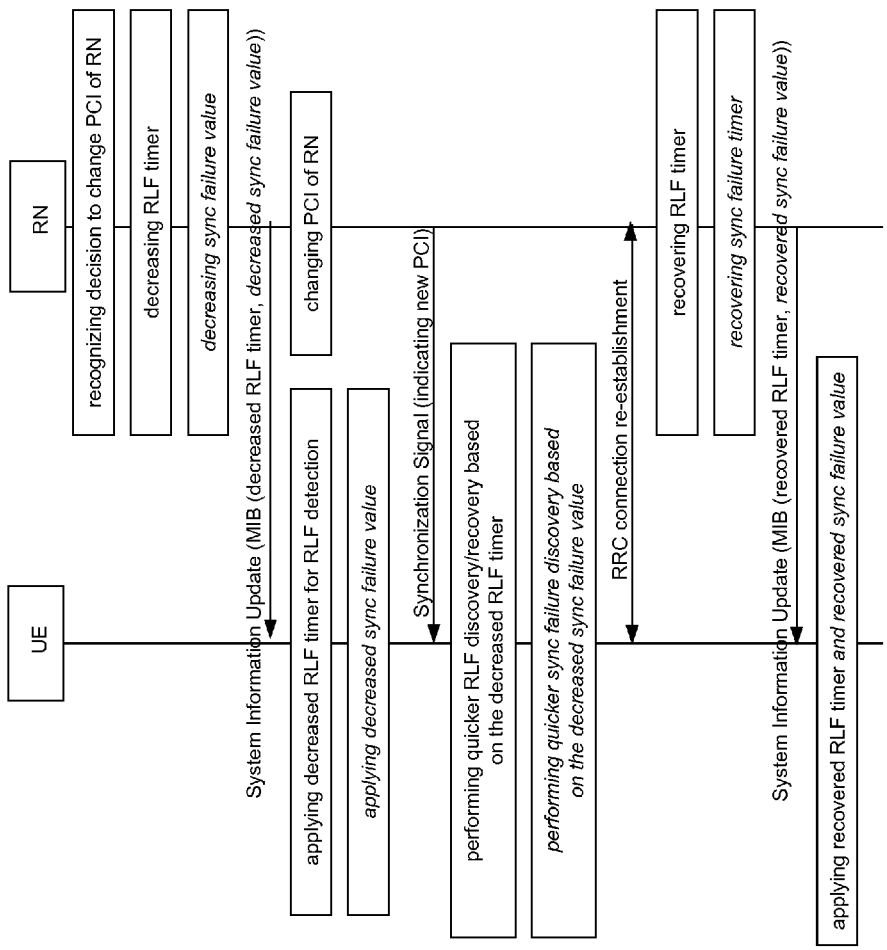
FIG. 6 shows a signaling diagram illustrating an exemplary network-based procedure according to exemplary embodiments of the present invention.

FIG. 6 shows a signaling diagram illustrating an exemplary network-based procedure, i.e. a network-based approach, according to exemplary embodiments of the present invention.

In the procedure according to FIG. 6, similar to the aforementioned UE-assisted approach, the (e.g. mobile) relay node or base station (hereinafter simply referred to as RN) representing the (e.g. mobile) relay cell recognizes that a decision to change its PCI (wherein the PCI is used hereinafter as a non-limiting example for any conceivable relay node/cell identifier which is a non-limiting example for any conceivable relay node/cell configuration) is made. This decision may be made locally or remotely, and it may be the outcome of any conceivable PCI collision detection procedure, such as for example any one of those described in connection with FIGS. 9 and 10 below. Upon recognition of the PCI change decision, the RN informs its served UE (wherein herein only a single UE is exemplarily depicted, while more than one UE may be applicable in this regard) in view of a forthcoming PCI change still before the PCI is changed. After the PCI is changed, the RN provides its served UE with a synchronization signal indicating the new PCI.

The present network-based approach differs from the aforementioned UE-assisted approach in the kind of advance information of a forthcoming PCI change and the corresponding effects thereof.

As depicted in FIG. 6, in view of the forthcoming configuration change, before changing the PCI on the fly, the RN informs the UE in advance by way of a system information update. To this end, the RN changes the settings to UE-TimersAndConstants, and informs the UE accordingly by way of a system information update with the changed settings. Such setting reconfiguration is effected to speedup the UE RLF recovery time period when the PCI is changed and the synchronization is lost. Specifically, according to FIG. 6, the RN decreases a RLF timer, such as the T310 timer according to current specifications. For example, the T310 timer value can be changed from 1000 ms to 1 ms. Alternatively or additionally, the RN decreases a synchronization failure value, such as the N310 value according to current specifications. For example, the N310 value can be changed from 2 or 3 to 1.

The RN updates the T310 timer temporarily for the UE by broadcasting the updated system information, and the UE applies the new value for the T310 timer received from the RN.

After the system information update is provided to the UE, the RN replaces the old PCI by the new selected PCI, i.e. performs the PCI change, and changes the synchronization signal accordingly. Upon the change of PCI, the RN informs its served UE/UEs (and, potentially, it neighbor(s), i.e. neighboring RNs, BSs, DeNBs, and the like) about the new PCI applied on its cell. That is, the RN sends a synchronization signal indicating the new and currently valid PCI to the UE. When detecting the new synchronization signal information indicating the new PCI, the UE looses synchronization with the previously serving relay cell due to the changed PCI. Based on the decreased T310 timer, the UE performs RLF discovery/recovery quicker than in the case of a normal operation. Thereupon, the UE initiates a RRC connection re-establishment process with the RN, and may thus connect quickly to the "new" cell indicated by the new PCI (but the RN is the same).

After the PCI is changed on the fly and the RLF recovery process of the UE (and the RRC connection re-establishment process) is completed, the RN reconfigures the T310 timer to the normal setting to avoid the possible negative impact to UE when handling a real RLF afterwards. Then, the RN informs the new setting to the UE by another system information update process.

As depicted in FIG. 6, the above-outlined basic procedure may be modified/enhanced by alternatively/additionally manipulating a synchronization failure value, such as N310 according to current specifications. Such modification/enhancement is depicted by way of operations printed in italics in FIG. 6.

That is, considering the potential delay on the UE side and the RN side upon the PCI change, the RN may configure the N310 value in the relay cell with a smaller value than during the normal operation, i.e. decrease the same, to speed up that the UE starting the synchronization failure discovery/recovery when receiving the above-described synchronization signal indicating the new PCI. Then, after being informed accordingly, the UE may apply the decreased N310 value for speeding up the synchronization failure discovery/recovery. For example, changing the N310 from 2 or 3 to 1 allows the UE to stay shorter in the N310 state (i.e. the time period between loss of synchronization and start of RLF discovery/recovery) and enter in the RLF recovery process without any delay. To avoid the potential negative impact of the decreased N310 value in comparison to the normal RLF case, the RN afterwards recovers the N310 value to its normal setting, and informs the UE of the normal setting by another system information update.

By virtue of the procedure according to FIG. 6, the service interruption time (delay) is reached faster than according to a conventional technique, and may thus be reduced. This is because, when the synchronization with the serving relay cell is lost due to the PCI change thereof, the UE does only (need to) wait for a shorter time and/or lower number of out-of-sync indications before entering the RLF recovery process. Due to this reduced delay, the service interruption time (delay) according to a conventional technique may be shortened. While this effect may well be achieved by way of the basic and/or modified procedure, it may be ensured (i.e. achieved with an even higher possibility) by way of the enhanced procedure. That is, the enhanced procedure further increases the reliability of such procedure.

The basic and/or enhanced network-based approach according to exemplary embodiments of the present invention is applicable both for legacy and non-legacy (modern) UEs. That is, this approach has no backward compatibility issue, i.e. is also applicable for legacy UEs lacking any specific functionality on the UE side.

In view of the above, the two approaches according to exemplary embodiments of the present invention may properly complement each other, and they can be used in different situations (as outlined hereinafter).

Figure 7:
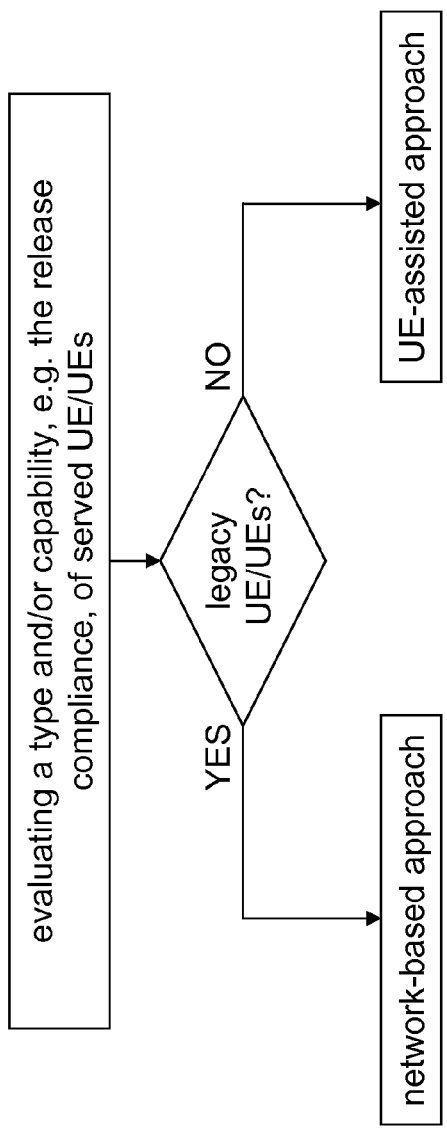
FIG. 7 shows a flowchart illustrating an exemplary selection procedure according to exemplary embodiments of the present invention.

FIG. 7 shows a flowchart illustrating an exemplary selection procedure according to exemplary embodiments of the present invention.

In the procedure according to FIG. 7, the RN evaluates a type and/or capability of one or more of its served UEs. Then, depending on the result of evaluation, the RN selects a way of informing the user equipment, i.e. whether to use the UE-assisted approach or the network-based approach, based on the evaluated type and/or capability of the user equipment or multiple user equipments.

According to exemplarily embodiments of the present invention, the type and/or capability of a UE may be its release compliance. That is, a UE of Release 10 or below may be considered to be of a legacy type and/or capability, while a UE of Release 11 or above may be considered to be of a non-legacy (modern) type and/or capability. In case the relevant UE or most of the served UEs are of Release 11 or above, i.e. of non-legacy type and/or capability, the UE-assisted approach can be used. Otherwise, the network-based approach can be used.

Namely, the decision of which one of the aforementioned approaches to use may be made for each UE individually or for all served UE on the basis of a majority decision or any other kind of decision on the basis of the type and/or capability evaluation.

By virtue of the procedure according to FIG. 7, the RN may properly select which one of the two aforementioned approaches and/or a combination thereof is most appropriate to be applied.

When the above-mentioned decision on the usable approach is made on the basis of a majority decision or the like, it is possible that the UE-assisted approach is selected even if legacy (old) UEs are served (since both non-legacy (modern) UEs and legacy (old) UEs are simultaneously served by the RN). Accordingly, a legacy (old) UE not supporting the corresponding functionality for the UE-assisted approach may receive information of an increased synchronization failure value according to the UE-assisted approach. The application of the increased synchronization failure value at the legacy (old) UE would be inefficient or even detrimental as to its performance.

According to exemplary embodiments of the present invention, an increased synchronization failure value may be accomplished by way of a dedicated information element (IE) in the system information update, specifically in the master information block or system information block. This dedicated IE can be a new IE different from the IE used by the legacy (old) UE that would not be able to understand it and therefore the inefficiency described above does not occur anymore.

When the above-mentioned decision on the usable approach is made on the basis of a majority decision or the like, it is possible that the network-based approach is selected even if non-legacy (modern) UEs are served (since both non-legacy (modern) UEs and legacy (old) UEs are simultaneously served by the RN). Accordingly, a non-legacy (modern) UE having the corresponding functionality for the UE-assisted approach may receive an information of a decreased RLF timer according to the network-based approach. The application of the decreased RLF timer at the non-legacy (modern) UE would be inefficient or even detrimental as to its performance.

According to exemplary embodiments of the present invention, the UE (i.e. the non-legacy/advanced UE) may (be configured to) ignore the thus received decreased RLF timer in case a new PCI is informed (which would represent the combination of the network-based and UE-assisted approaches). Thereby, a potential negative impact to non-legacy/advanced UEs because of a temporary RLF timer decrease may be avoided. In particular, it may be avoided that a non-legacy/advanced UE is subject to a RLF (even if the discovery/recovery of such RLF is accelerated by way of the network-based approach) which is not necessarily required, since it may even be avoided due to the specific functionality of the non-legacy/advanced UE.

Figure 8:
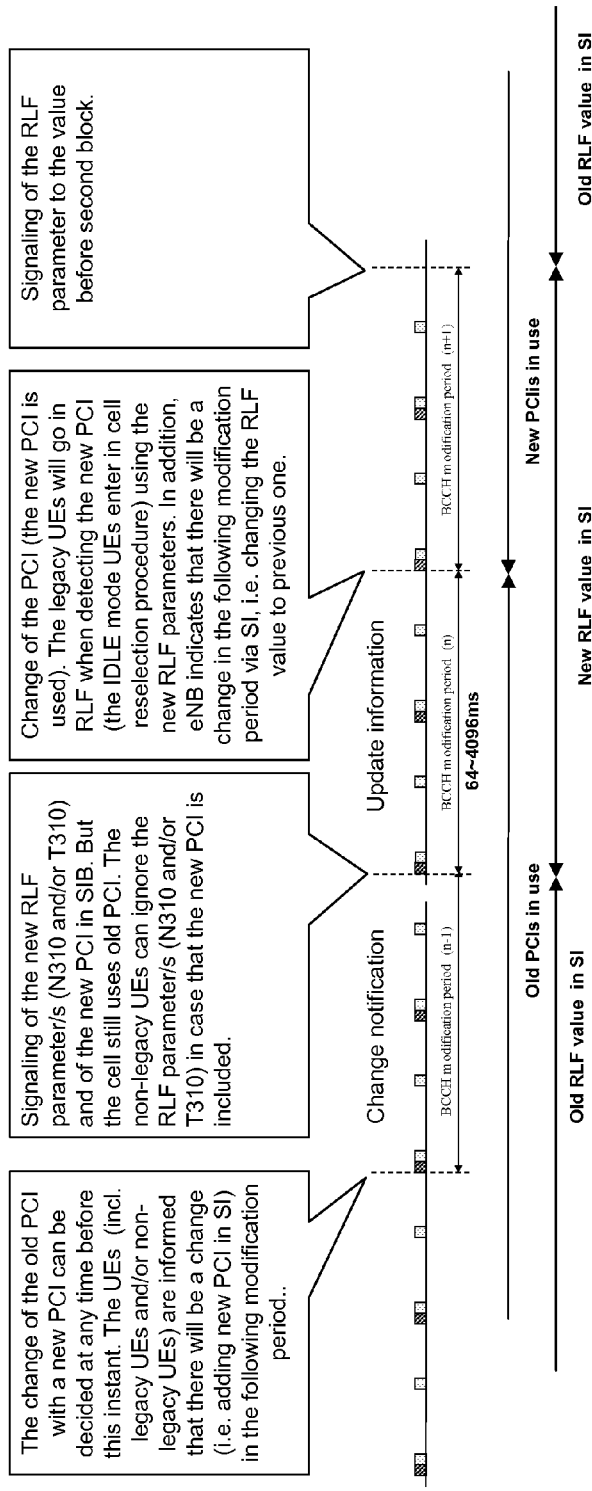
FIG. 8 shows a time chart illustrating an exemplary process according to exemplary embodiments of the present invention.

A corresponding process is illustrated in FIG. 8 which shows a time chart illustrating an exemplary process according to exemplary embodiments of the present invention.

When the above-mentioned decision on the usable approach is made for each UE individually, it is possible that the RN performs a combination of the two aforementioned approaches. Hence, relay nodes according to exemplary embodiments of the present invention are configured accordingly. FIG. 8 especially shows how the system information may be utilized to notify the change of PCI and the change/recovery of RLF values according to exemplary embodiments of the present invention.

As a result of the above-described selection (of a way of UE information including corresponding parameter settings), according to exemplary embodiments of the present invention, it may be achieved that legacy (old) UEs are configured with a lower RLF timer value (i.e. a shorter RLF timer) while non-legacy (modern) UEs are configured with a higher RLF timer value (i.e. a longer RLF timer). According to exemplary embodiments of the present invention, node/cell identifier collision (and/or confusion) detection may be achieved.

Such collision (and/or confusion) detection according to exemplary embodiments of the present invention is generally independent of the aforementioned (e.g. mobile) relay cell reconfiguration according to exemplary embodiments of the present invention, but may build a basis thereof. Namely, as mentioned above, the outcome of such collision (and/or confusion) detection according to exemplary embodiments of the present invention may constitute a decision to change the PCI of a (e.g. mobile) relay node/cell (wherein the PCI is used hereinafter as a non-limiting example for any conceivable relay node/cell identifier), such as that according to FIGS. 5 and/or 6.

The above description basically applies for active legacy and non-legacy UEs, i.e. assumes that the concerned UE/UEs is/are in active mode. When a UE is in idle mode, it monitors the system information (e.g. system information update, master information block, etc.) and update them upon receiving the system information change in paging occasion. The non-legacy UEs know that the PCI is changed and then, when they enter into connected mode, they can use the new PCI without entering cell reselection procedure. The legacy UEs, when changing from idle to connected mode, may enter into cell reselection procedure because the base station (or moving relay) uses a different PCI.

Figure 9:
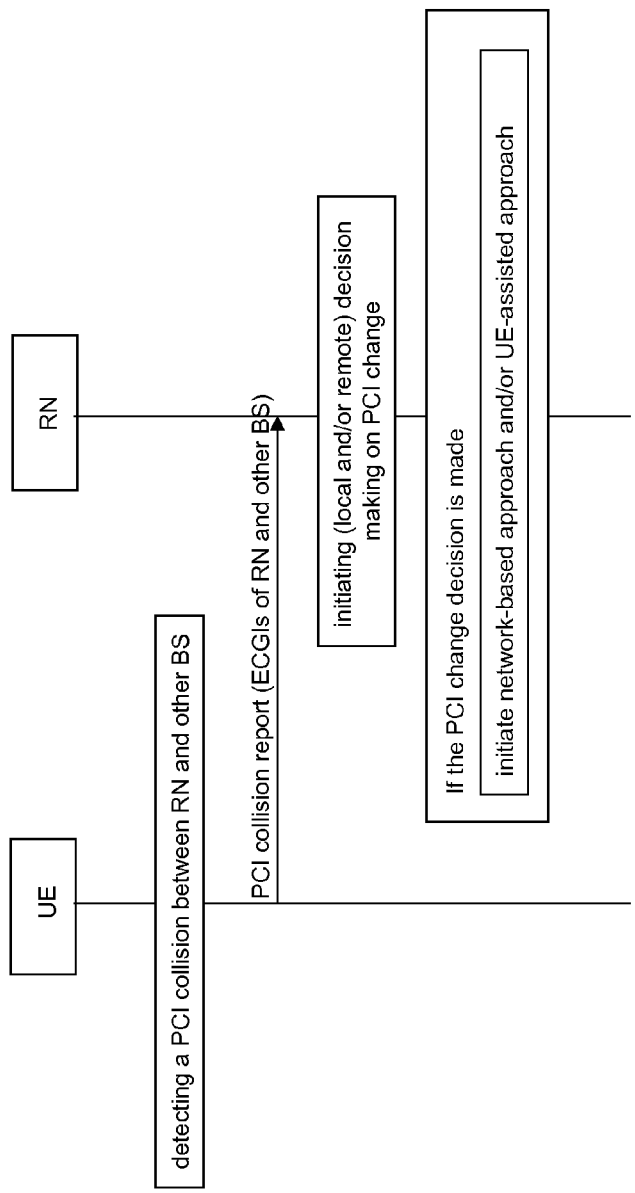
FIG. 9 shows a signaling diagram illustrating an exemplary user-side collision detection procedure according to exemplary embodiments of the present invention.
Figure 10:
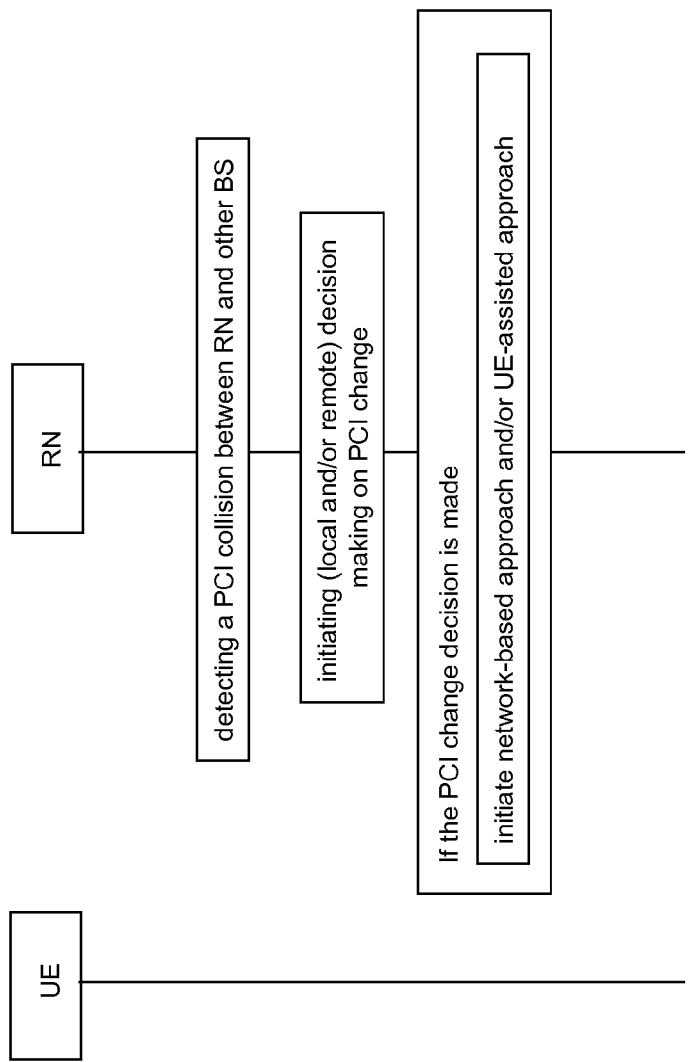
FIG. 10 shows a signaling diagram illustrating an exemplary network-side collision detection procedure according to exemplary embodiments of the present invention.

FIG. 9 shows a signaling diagram illustrating an exemplary user-side collision detection procedure according to exemplary embodiments of the present invention. FIG. 10 shows a signaling diagram illustrating an exemplary network-side collision detection procedure according to exemplary embodiments of the present invention.

In the procedure according to FIG. 9, the UE which is served by the RN detects that the same PCI is used by the RN and another node (base station), e.g. of a neighboring cell. Such detection may be made when the same PCI indicated by PSCH/SSCH (Primary/Secondary Synchronization Channel of the RN is used by one or more different cells, i.e. wherein the ECGI (evolved cell global identifier) (which is used herein as a non-limiting example of a cell identifier) of the involved cells are different. When detecting such PCI collision, the UE reports the PCI collision to the serving cell (RN cell) by a corresponding message. This message shall include the detected ECGIs of the related cells.

In the procedure according to FIG. 10, the RN detects that the same PCI is used by it and another node (base station), e.g. of a neighboring cell. For example, as the RN typically employs its UE functionalities when communicating with the donor base station (DeNB), the RN, during this phase, can detect a neighbor cell using the same PCI as a normal UE would do. Such detection may be made when the same PCI indicated by PSCH/SSCH (Primary/Secondary Synchronization Channel of the RN is used by one or more different cells, i.e. wherein the ECGI (evolved cell global identifier) (which is used herein as a non-limiting example of a cell identifier) of the involved cells are different.

Upon reception of the report message from the UE or upon detecting the PCI collision itself, the RN of the serving cell (RN cell) initiates a decision making on a change of its PCI, which may be effected locally or remotely. Upon a corresponding PCI change decision being recognized by the RN, the RN performs the aforementioned procedure according to any one of FIGS. 5 to 8, i.e. the UE-assisted approach, the network-based approach or a combination thereof according to exemplary embodiments of the present invention.

For example, the RN may inform the PCI collision problem to an OAM (Operation and Maintenance) system, and the OAM system may decide in which cell to change the PCI and provide the concerned cell with a new PCI to avoid the PCI collision. Based on the command from the OAM system or the decision made locally based on local information, the RN cell or the relevant neighbor DeNB/eNB cell may initiate the PCI change process as described before.

As mentioned earlier, any preceding reference to a configuration of a base station may equally apply to one of the aforementioned examples of conceivable configuration settings. That is, instead of or in addition to the above-referenced identifier (e.g. PCI), the relevant configuration could include any other cell-related setting of the base station, i.e. any parameter or setting, the change of which would make a (legacy) UE to loose its cell (because of being not aware of the possibility of such changes).

For example, the relevant configuration could include one or more the following:
- an identifier, such as a physical cell identifier, of the base station,
- a used bandwidth of the base station (where low bandwidth may be used to reduce interference while higher bandwidth can be used without disadvantage in cases or times when or where interference is not an issue),
- an antenna configuration of the base station (the antenna configuration (e.g. a number of antennas, their usage, etc.), which could be particularly applicable when (as intended for future base stations) there are two different possibilities to run configurations with more than two antennas, either—as an example—with common reference symbols (CRS) for all four antennas, or with only two CRS for two antennas (or linear combinations thereof, called virtual antennas) and specific CSI-RS (Reference symbols for channel estimation) placed exactly where needed; the latter allows for less overhead, but is only applicable for new UEs after Release 10, while old UEs can basically only use the two virtual antennas; depending on the distribution of UEs, their capabilities and the channel conditions, either method may better in the end, so there is a need and possibility to switch according to exemplary embodiments of the present invention),
- a codec assignment of the base station (like e.g. scrambling to achieve better orthogonality of interference averaging with neighbor cells or other enhancements of the coding to better utilize interference averaging or alleviation),
- a timing setting of the base station (e.g. to optimize alignment with other base stations for better interference management, which may also need to be dynamic if situation changes, i.e. if alignment needs to be done with different base stations as users move from one overlap area to another), and
- a frequency and/or channel setting of the base station (for example, frequency, i.e. carrier, number used by the base station, which may contribute to get better alignment/disalignment with neighbor base stations, i.e. proper frequency reuse which depends on how densely the border area to different neighbors is populated, which is time varying).

The above-described procedures and functions may be implemented by respective functional elements, processors, or the like, as described below.

While in the foregoing exemplary embodiments of the present invention are described mainly with reference to methods, procedures and functions, corresponding exemplary embodiments of the present invention also cover respective apparatuses, network nodes and systems, including both software and/or hardware thereof.

Respective exemplary embodiments of the present invention are described below referring to FIG. 11, while for the sake of brevity reference is made to the detailed description of respective corresponding methods and operations according to FIGS. 5 to 9 as well as the underlying system architecture and basic principles according to FIGS. 1 to 4.

Figure 11:
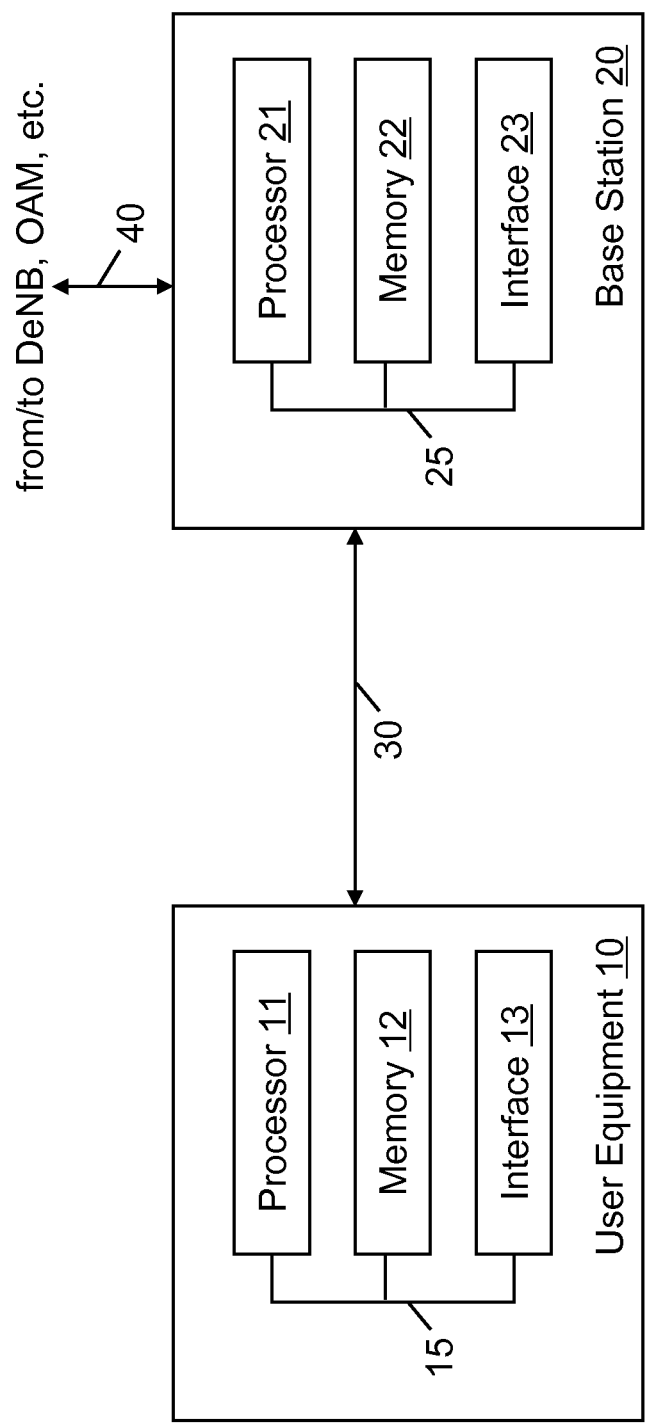
FIG. 11 shows a block diagram illustrating exemplary devices according to exemplary embodiments of the present invention.

In FIG. 11 below, the solid line blocks are basically configured to perform respective operations as described above. The entirety of solid line blocks are basically configured to perform the methods and operations as described above, respectively. With respect to FIG. 11, it is to be noted that the individual blocks are meant to illustrate respective functional blocks implementing a respective function, process or procedure, respectively. Such functional blocks are implementation-independent, i.e. may be implemented by means of any kind of hardware or software, respectively. The arrows and lines interconnecting individual blocks are meant to illustrate an operational coupling there-between, which may be a physical and/or logical coupling, which on the one hand is implementation-independent (e.g. wired or wireless) and on the other hand may also comprise an arbitrary number of intermediary functional entities not shown. The direction of arrow is meant to illustrate the direction in which certain operations are performed and/or the direction in which certain data is transferred.

Further, in FIG. 11, only those functional blocks are illustrated, which relate to any one of the above-described methods, procedures and functions. A skilled person will acknowledge the presence of any other conventional functional blocks required for an operation of respective structural arrangements, such as e.g. a power supply, a central processing unit, respective memories or the like. Among others, memories are provided for storing programs or program instructions for controlling the individual functional entities to operate as described herein.

FIG. 11 shows a block diagram illustrating exemplary devices according to exemplary embodiments of the present invention. As mentioned above, it is noted that the illustration of (electronic) devices according to FIG. 11 is simplified.

In view of the above, the thus described apparatuses 10, and 20 are suitable for use in practicing the exemplary embodiments of the present invention, as described herein. The thus described apparatus 10 on the left hand side may represent a (part of a) user equipment UE, as described above, and may be configured to perform a procedure and/or exhibit a functionality as described in conjunction with any one of FIGS. 5, 6, 8, 9 and 10. The thus described apparatus 20 on the right hand side may represent a (part of a) base station or access node, such as for example a (e.g. mobile) relay node or base station, as described above, and may be configured to perform a procedure and/or exhibit a functionality as described in conjunction with any one of FIGS. 5 to 10.

As shown in FIG. 11, according to exemplary embodiments of the present invention, a user equipment 10 comprises a processor 11, a memory 12, and an interface 13, which are connected by a bus 15 or the like, and a base station or relay node 20 comprises a processor 21, a memory 22, and an interface 23, which are connected by a bus 25 or the like. The user equipment 10 may be connected with the base station or relay node 20 through a link or connection 30, and the base station or relay 10 may be connected with a (another) base station (e.g. DeNB/eNB) or relay node or an OAM system or the like through a link or connection 40.

The memories 12 and 22 may store respective programs assumed to include program instructions that, when executed by the associated processors 11 and 21, enable the respective electronic device to operate in accordance with the exemplary embodiments of the present invention. The processors 11 and 21 may also include a modem or the like to facilitate communication over the (hardwire or wireless) links 30 and 40 via the interfaces 13 and 23, respectively. The interfaces 13 and 23 may further include a suitable transceiver coupled to one or more antennas or communication means for (hardwire or wireless) communications with the linked or connected device(s), respectively. The interfaces 13 and 23 are configured to communicate with another apparatus, i.e. the interface thereof.

In general terms, the respective devices (and/or parts thereof) may represent means for performing respective operations and/or exhibiting respective functionalities, and/or the respective devices (and/or parts thereof) may have functions for performing respective operations and/or exhibiting respective functionalities.

According to exemplary embodiments of the present invention, the processor 11 is configured to receive, via the interface 13, an information in view of a forthcoming change of a configuration of a (e.g. mobile relay) base station, and to receive, via the interface 13, a provision of a synchronization signal indicating a valid configuration of the (e.g. mobile relay) base station.

Further, the processor 11 may be configured to store, in the memory 12, upon receipt of the information, a mapping between the old configuration and the new configuration of the (e.g. mobile relay) base station, to check, upon receipt of the synchronization signal, whether a mapping between the old configuration and the valid configuration indicated in the synchronization signal is stored, and to update, if a mapping between the old configuration and the valid configuration indicated in the synchronization signal is stored, the old configuration with the new configuration based on the stored mapping, or to initiate, if a mapping between the old configuration and the valid configuration indicated in the synchronization signal is not stored, a cell measurement and reselection process using the valid configuration indicated in the synchronization signal.

Further, the processor 11 may be configured to receive, via the interface 13, in the information, a synchronization failure value for detecting a synchronization failure, and to apply the received synchronization failure value for synchronization failure detection before receiving a different synchronization failure value from the (e.g. mobile relay) base station.

Further, the processor 11 may be configured to receive, vie the interface 13, in the information, a radio link failure timer for detecting a radio link failure at the user equipment. If so, the processor 11 may be configured to apply the received radio link failure timer for radio link failure detection before receiving a different radio link failure timer from the (e.g. mobile relay) base station, and to perform a connection reestablishment process after radio link failure detection using the received radio link failure timer. Further, the processor 11 may be configured to ignore the received radio link failure timer depending on a type and/or capability of user equipment being served by the (e.g. mobile relay) base station.

Further, the processor 11 may be configured to detect a collision between the configuration of the (e.g. mobile relay) base station and at least one other base station, and to send, via the interface 13, a report on the detected collision to the (e.g. mobile relay) base station, said report including evolved cell configurations of the (e.g. mobile relay) base station and the other base station.

According to exemplary embodiments of the present invention, the processor 21 is configured to recognize a decision on a change of a configuration of a (e.g. mobile relay) base station, to inform, via the interface 23, a user equipment served by the (e.g. mobile relay) base station in view of a forthcoming change of the configuration before the configuration of the (e.g. mobile relay) base station is changed, and to provide, via the interface 23, the user equipment being served by the (e.g. mobile relay) base station with a synchronization signal indicating a new configuration after the configuration of the (e.g. mobile relay) base station is changed from an old configuration to the new configuration.

Further, the processor 21 may be configured to include an indication of the forthcoming change of the configuration, e.g. by way of a 1-bit signaling.

Further, the processor 21 may be configured to include the new configuration or the new and old configurations.

Further, the processor 21 may be configured to increase a synchronization failure value for detecting a synchronization failure at the user equipment before the configuration of the (e.g. mobile relay) base station is changed, to inform, via the interface 23, the increased synchronization failure value, and to recover the synchronization failure value and inform, via the interface 23, the recovered synchronization failure value after the configuration of the (e.g. mobile relay) base station is changed.

Further, the processor 21 may be configured to include a radio link failure timer for detecting a radio link failure at the user equipment.

Further, the processor 21 may be configured to decrease the radio link failure timer before the configuration of the (e.g. mobile relay) base station is changed, to inform, via the interface 23, the decreased radio link failure timer, and to recover the radio link failure timer and inform, via the interface 23, the recovered radio link failure timer after the configuration of the (e.g. mobile relay) base station is changed.

Further, the processor 21 may be configured to evaluate a type and/or capability of the user equipment or multiple user equipments served by the (e.g. mobile relay) base station, and to select a way of informing the user equipment based on the evaluated type and/or capability of the user equipment or multiple user equipments.

Further, the processor 21 may be configured to detect a collision between the configuration of the base station and at least one other base station, or to receive, via the interface 23, from a user equipment served by the (e.g. mobile relay) base station, a report on a collision between the configuration of the (e.g. mobile relay) base station and at least one other base station, said report including evolved cell configurations of the (e.g. mobile relay) base station and the other base station, to initiate making a decision on a change of the configuration of the (e.g. mobile relay) base station or the other base station, and to perform the informing and the providing when recognizing the decision on the change of the configuration of the (e.g. mobile relay) base station.

According to exemplarily embodiments of the present invention, a system may comprise any conceivable combination of the thus depicted apparatuses and other network elements, which are configured to cooperate as described above.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Such software may be software code independent and can be specified using any known or future developed programming language, such as e.g. Java, C++, C, and Assembler, as long as the functionality defined by the method steps is preserved. Such hardware may be hardware type independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components. An apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor. A device may be regarded as an apparatus or as an assembly of more than one apparatus, whether functionally in cooperation with each other or functionally independently of each other but in a same device housing, for example.

Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for a cell reconfiguration, more specifically a cell reconfiguration in a relay-enhanced network environment. Such measures exemplarily comprise recognizing a decision on a change of a configuration of a base station, informing a user equipment served by the base station in view of a forthcoming change of the configuration before the configuration of the base station is changed, and providing the user equipment being served by the base station with a synchronization signal indicating a new configuration after the configuration of the base station is changed from an old configuration to the new configuration.

The measures proposed according to exemplary embodiments of the present invention may be applied for any kind of network environment, particularly in any kind of heterogeneous network environment, such as for example for those in accordance with 3GPP RAN2/RAN3 standards and/or 3GPP LTE standards of release 10/11/12/ . . . (LTE-Advanced and its evolutions).

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

The invention claimed is:

1. A method comprising:
   at a base station, recognizing that a change of a prior configuration of the base station to a new configuration is forthcoming, wherein the prior configuration and the new configuration include a physical cell identifier;
   based on a potential delay of the forthcoming change of the physical cell identifier of the configuration, reconfiguring by the base station, of a synchronization failure value to change a time required to detect a synchronization failure at the user equipment served by the base station;
   informing, by the base station, the user equipment due to the forthcoming change of the prior configuration before the prior configuration of the base station is changed to the new configuration, wherein the informing includes informing the user equipment of the reconfigured synchronization failure value to be used at the user equipment; and
   providing, by the base station, to the user equipment being served by the base station a synchronization signal indicating the new configuration after the prior configuration of the base station is changed to the new configuration,
   wherein the synchronization failure value that was in use before the reconfiguring is recovered in response to the new configuration being active.

2. The method according to claim 1, wherein the reconfiguring comprises increasing the synchronization failure value to change the time required to detect a synchronization failure at the user equipment before the prior configuration of the base station is changed to the new configuration, and the informing further comprises informing the user equipment of the increased synchronization failure value, and the method further comprises recovering a pre-reconfiguration synchronization failure value and informing the user equipment of the recovered pre-reconfiguration synchronization failure value after the prior configuration of the base station is changed to the new configuration.

3. The method according to claim 1, wherein the reconfiguring comprises decreasing a radio link failure timer value before the prior configuration of the base station is changed to the new configuration, and informing further comprises informing the user equipment of the decreased radio link failure timer value; and the method further comprises recovering a pre-reconfiguration radio link failure timer value and informing the user equipment of the recovered pre-reconfiguration radio link failure timer value after the prior configuration of the base station is changed to the new configuration.

4. The method according to claim 1, further comprising evaluating whether the user equipment or multiple user equipment served by the base station is of a legacy or a non-legacy type; and selecting a way of informing the user equipment based on the evaluation.

5. The method according to claim 1, further comprising detecting a physical cell identifier collision between the prior configuration of the base station and at least one other base station, or receiving from the user equipment served by the base station, a report on a physical cell identifier collision between the prior configuration of the base station and at least one other base station, said report including evolved cell configurations of the base station and the other base station;

making a decision on the change of the prior configuration of the base station or the other base station; and performing the informing and the providing when recognizing the decision on the change of the prior configuration of the base station to the new configuration.

6. A method comprising at a user equipment, receiving information due to a forthcoming change of a prior configuration of a base station to a new configuration, wherein the information includes a reconfigured synchronization failure value to change a time required by the user equipment to detect a synchronization failure, wherein the prior configuration and the new configuration include a physical cell identifier;

applying the reconfigured synchronization failure value for the synchronization failure detection; and receiving a provision of a synchronization signal indicating the new configuration of the base station, wherein the synchronization failure value that was in use before the reconfiguring is recovered in response to the new configuration being active.

7. The method according to claim 6, further comprising storing, upon receipt of the information, a mapping between the prior configuration and the new configuration of the base station;

checking, upon receipt of the synchronization signal, whether a mapping between the prior configuration and the new configuration indicated in the synchronization signal corresponds to the stored mapping between the prior configuration and the new configuration; and performing, if the mapping between the prior configuration and the new configuration indicated in the synchronization signal corresponds to the previously stored mapping between the prior configuration and the new configuration, updating the prior configuration with the new configuration based on the stored mapping, or performing, if the mapping between the prior configuration and the new configuration indicated in the synchronization signal does not correspond to the stored mapping between the prior configuration and the new configuration, a cell measurement and reselection process using the new configuration indicated in the synchronization signal.

8. The method according to claim 7, further comprising receiving, in the information, the reconfigured synchronization failure value to change the time required to detect a synchronization failure; and applying the received synchronization failure value for synchronization failure detection before receiving a different synchronization failure value from the base station.

9. The method according to claim 6, further comprising detecting a physical cell identifier collision between the prior configuration of the base station and at least one other base station; and sending a report on the detected collision to the base station, said report including evolved cell configurations of the base station and the other base station.

10. An apparatus comprising:

an interface configured to communicate with at least one user equipment, and a processor, a memory comprising computer program code, the memory and the computer program code configured, with the processor, to cause a base station at least to:

recognize that a change of a prior configuration of the base station to a new configuration is forthcoming, wherein the prior configuration and the new configuration include a physical cell identifier;

based on a delay of the change of the physical cell identifier of the new configuration, reconfigure a synchronization failure value to change a time required to detect a synchronization failure at a user equipment of the at least one user equipment served by the base station;

inform, via the interface, the user equipment due to the forthcoming change of the prior configuration before the prior configuration of the base station is changed to, the new configuration, wherein the informing includes informing the user equipment of the reconfigured synchronization failure value to be used by the user equipment; and provide, via the interface, the user equipment being served by the base station with a synchronization signal indicating the new configuration after the prior configuration of the base station is changed to the new configuration, wherein the synchronization failure value that was in use before the reconfiguring is recovered in response to the new configuration being active.

11. The apparatus according to claim 10, wherein the reconfiguring comprises increasing the synchronization failure value to change the time required to detect a synchronization failure at the user equipment before the prior configuration of the base station is changed to the new configuration, and
the informing comprises to inform, via the interface, the user equipment of the increased synchronization failure value, and
the memory and the computer program code are further configured, with the processor, to cause the apparatus to recover a pre-reconfiguration synchronization failure value and inform, via the interface, the recovered pre-reconfiguration synchronization failure value after the prior configuration of the base station is changed to the new configuration.

12. The apparatus according to claim 10, wherein
the reconfiguring further comprises decreasing a radio link failure timer value before the prior configuration of the base station is changed to the new configuration,
the informing further comprises informing, via the interface, to the user equipment the decreased radio link failure timer value, and
wherein the memory and the computer program code are further configured, with the processor, to cause the apparatus to recover a pre-reconfiguration radio link failure timer value and inform the user equipment of the recovered pre-reconfiguration radio link failure timer value after the prior configuration of the base station is changed to the new configuration.

13. The apparatus according to claim 10, wherein the memory and the computer program code are further configured, with the processor, to cause the apparatus to:
evaluate whether the user equipment or multiple user equipment served by the base station is of a legacy or a non-legacy type; and
select a way of informing the user equipment based on the evaluation.

14. The apparatus according to claim 10, wherein the memory and the computer program code are further configured, with the processor, to cause the apparatus to:
detect a physical cell identifier collision between the prior configuration of the base station and at least one other base station, or
receive, via the interface, from a user equipment served by the base station, a report on a physical cell identifier collision between the prior configuration of the base station and at least one other base station, said report including evolved cell configurations of the base station and the other base station,
make a decision on the change of the prior configuration of the base station or the other base station to the new configuration, and
perform the informing and the providing when recognizing the decision on the change of the prior configuration of the base station to the new configuration.

15. An apparatus comprising
an interface configured to communicate with a base station, and
a processor,
a memory comprising computer program code,
the memory and the computer program code configured, with the processor, to cause the apparatus to:
receive at a user equipment served by the base station, via the interface, information due to a forthcoming change of a prior configuration of the base station to a new configuration, wherein the information includes a reconfigured synchronization failure value to change a time required to detect a synchronization failure at the user equipment, wherein the prior configuration and the new configuration include a physical cell identifier to be used at the user equipment;
apply the reconfigured synchronization failure value far the synchronization failure detection; and
receive, via the interface, a synchronization signal indicating the new configuration of the base station,
wherein the synchronization failure value that was in use before the reconfiguring is recovered in response to the new configuration being active.

16. The apparatus according to claim 15, wherein the memory and the computer program code are further configured, with the processor, to cause the apparatus to:
store, in a storage, upon receipt of the information, a mapping between the prior configuration and the new configuration of the base station;
check, upon receipt of the synchronization signal, whether a mapping between the prior configuration and the new configuration indicated in the synchronization signal corresponds to the stored mapping between the prior configuration and the new configuration; and
perform, if the mapping between the prior configuration and the new configuration indicated in the synchronisation signal corresponds to the stored mapping between the prior configuration and the new configuration, updating the prior configuration with the new configuration based on the stored mapping, or
perform, if the mapping between the prior configuration and the new configuration indicated in the synchronization signal does not correspond to the stored mapping between the prior configuration and the new configuration, a cell measurement and reselection process using the new configuration indicated in the synchronization signal.

17. The apparatus according to claim 16, wherein the memory and the computer program code configured, with the processor, to cause the apparatus to:
receive, via the interface, in the information, the reconfigured synchronization failure value to change the time required to detect a synchronization failure; and
apply the received reconfigured synchronization failure value for synchronization failure detection before receiving a different synchronization failure value from the base station.

18. The apparatus according to claim 15, wherein the memory and the computer program code configured, with the processor, to cause the apparatus to:
detect a physical cell identifier collision between the prior configuration of the base station and at least one other base station; and
send, via the interface, a report on the detected collision to the base station, said report including evolved cell configurations of the base station and the other base station.

19. A computer program product including a non-transitory computer-readable medium comprising software code portions being arranged, when run on a processor of an apparatus, to cause the apparatus to perform:
recognizing that a change of a prior configuration of a base station to a new configuration is forthcoming, wherein the prior configuration and the new configuration include a physical cell identifier;
based on a potential delay of the forthcoming change of the physical cell identifier of the configuration, reconfiguring a synchronization failure value to change a time required to detect a synchronization failure at a user equipment served by the base station;

informing the user equipment due to the forthcoming change of the prior configuration before the prior configuration of the base station is changed to the new configuration, wherein the informing includes informing the user equipment of the reconfigured synchronization failure value; and providing the user equipment being served by the base station with a synchronization signal indicating the new configuration after the prior configuration of the base station is changed to the new configuration, wherein the synchronization failure value that was in use before the reconfiguring is recovered in response to the new configuration being active.

20. A computer program product including a non-transitory computer-readable medium comprising software code portions being arranged, when run on a processor of an apparatus, to cause the apparatus to perform:

receiving an information due to a forthcoming change of a prior configuration of a base station to a new configuration, wherein the information includes a reconfigured synchronization failure value to change a time required at a user equipment served by the base station to detect a synchronization failure wherein the prior configuration and the new configuration include a physical cell identifier;

applying at least one of the reconfigured synchronization failure value for the synchronization failure detection; and receiving a provision of a synchronisation signal indicating the new configuration of the base station, wherein the synchronization failure value that was in use before the reconfiguring is recovered in response to the new configuration being active.

21. The method according to claim 1, wherein providing the user equipment being served by the base station with the synchronization signal indicating the new configuration is using a dedicated information element in a system information update to the user equipment.

22. The method according to claim 1, wherein the user equipment is a non-legacy user equipment, and wherein the reconfiguring comprises, based on the user equipment being a non-legacy user equipment, increasing a radio link failure timer value before the configuration of the base station.

* * * * *

UNITED STATES PATENT AND TRADEMARK OFFICE
CERTIFICATE OF CORRECTION

PATENT NO. : 10,187,809 B2
APPLICATION NO. : 14/008635
DATED : January 22, 2019
INVENTOR(S) : Shun Liang Zhang et al.

Page 1 of 1

It is certified that error appears in the above-identified patent and that said Letters Patent is hereby corrected as shown below:

In the Claims

In Claim 15:
Column 26, Line 6, "far" should be deleted and --for-- should be inserted.

In Claim 16:
Column 26, Line 25, "synchronisation" should be deleted and --synchronization-- should be inserted.

In Claim 20:
Column 28, Line 8, "synchronisation" should be deleted and --synchronization-- should be inserted.

Signed and Sealed this
Sixteenth Day of April, 2019

Andrei Iancu
*Director of the United States Patent and Trademark Office*